(12) United States Patent
Yano et al.

(10) Patent No.: US 10,834,382 B2
(45) Date of Patent: Nov. 10, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Akane Yano, Tokyo (JP); Tsubasa Tsukahara, Tokyo (JP); Tomohisa Tanaka, Tokyo (JP); Ryo Fukazawa, Kanagawa (JP); Kenji Sugihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/097,471

(22) PCT Filed: Mar. 23, 2017

(86) PCT No.: PCT/JP2017/011873
§ 371 (c)(1),
(2) Date: Oct. 29, 2018

(87) PCT Pub. No.: WO2017/203818
PCT Pub. Date: Nov. 30, 2017

(65) Prior Publication Data
US 2019/0149811 A1 May 16, 2019

(30) Foreign Application Priority Data
May 23, 2016 (JP) .................. 2016-102284

(51) Int. Cl.
*G03B 35/18* (2006.01)
*H04N 13/00* (2018.01)
(Continued)

(52) U.S. Cl.
CPC ........... *H04N 13/398* (2018.05); *G03B 35/08* (2013.01); *G03B 35/18* (2013.01); *G06T 19/00* (2013.01);
(Continued)

(58) Field of Classification Search
CPC .................................................. H04N 13/398
See application file for complete search history.

(56) References Cited

U.S. PATENT DOCUMENTS 9,013,561 B2 * 4/2015 Hyodo ................. H04N 13/128
348/51
9,118,894 B2 * 8/2015 Shinohara ............ H04N 13/111
(Continued)

FOREIGN PATENT DOCUMENTS

JP   H11-338457 A   12/1999
JP   2005-110121 A   4/2005
(Continued)

OTHER PUBLICATIONS

Jul. 17, 2019, European Search Report issued for related EP Application No. 17802420.4.
(Continued)

*Primary Examiner* — Irfan Habib
(74) *Attorney, Agent, or Firm* — Paratus Law Group, PLLC

(57) ABSTRACT

There is provided an information processing apparatus, an information processing method, and a program, the information processing apparatus including: a control unit that determines a display method for an object in a virtual space on a basis of a positional relationship between the object and a viewpoint. A binocular parallax regarding the object which is to be imparted to a user varies depending on the determined display method.

17 Claims, 7 Drawing Sheets

(51) Int. Cl.
*H04N 13/30* (2018.01)
*H04N 13/398* (2018.01)
*G06T 19/00* (2011.01)
*G03B 35/08* (2006.01)
*H04N 13/20* (2018.01)
*H04N 13/289* (2018.01)
*H04N 13/128* (2018.01)
*H04N 13/344* (2018.01)
*H04N 13/359* (2018.01)

(52) U.S. Cl.
CPC ........... *H04N 13/00* (2013.01); *H04N 13/128* (2018.05); *H04N 13/20* (2018.05); *H04N 13/289* (2018.05); *H04N 13/30* (2018.05); *H04N 13/344* (2018.05); *H04N 13/359* (2018.05)

(56) References Cited

U.S. PATENT DOCUMENTS

| | | | | |
|---|---|---|---|---|
| 2006/0192776 A1* | 8/2006 | Nomura | ............... | H04N 13/139 345/419 |
| 2010/0086222 A1* | 4/2010 | Shimizu | ............... | H04N 19/61 382/232 |
| 2010/0201789 A1* | 8/2010 | Yahagi | ............... | H04N 13/139 348/51 |
| 2011/0018969 A1* | 1/2011 | Tanaka | ............... | H04N 13/128 348/47 |
| 2011/0221866 A1* | 9/2011 | Ohta | ............... | G02B 30/27 348/46 |
| 2011/0228057 A1* | 9/2011 | Kobayashi | ............... | H04N 13/361 348/51 |
| 2012/0108328 A1* | 5/2012 | Konno | ............... | H04N 13/398 463/31 |
| 2012/0169723 A1* | 7/2012 | Sakurai | ............... | H04N 13/282 345/419 |
| 2013/0113793 A1* | 5/2013 | Uchida | ............... | G06T 15/00 345/419 |
| 2013/0314402 A1* | 11/2013 | Furumura | ............... | G06T 15/205 345/419 |
| 2014/0168381 A1* | 6/2014 | Wada | ............... | H04N 13/239 348/47 |
| 2014/0362197 A1* | 12/2014 | Takeyama | ............... | H04N 13/279 348/54 |
| 2015/0091818 A1* | 4/2015 | Kim | ............... | H04N 13/167 345/173 |
| 2018/0192023 A1* | 7/2018 | Sun | ............... | H04N 13/128 |
| 2019/0241070 A1* | 8/2019 | Ota | ............... | G02B 27/01 |
| 2019/0247751 A1* | 8/2019 | Tamaoki | ............... | A63F 13/25 |

FOREIGN PATENT DOCUMENTS

| | | |
|---|---|---|
| JP | 2011-064894 A | 3/2011 |
| JP | 2011-124941 A | 6/2011 |
| JP | 2011-205358 A | 10/2011 |
| JP | 2012-054877 A | 3/2012 |
| JP | 2012-141819 A | 7/2012 |
| WO | WO 2014/057618 A1 | 4/2014 |

OTHER PUBLICATIONS

Apr. 11, 2019, European Search Report issued for related EP Application No. 17802420.4.

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/011873 (filed on Mar. 23, 2017) under 35 U.S.C. § 371, which claims priority to Japanese Patent Application No. 2016-102284 (filed on May 23, 2016), which are all hereby incorporated by reference in their entirety.

TECHNICAL FIELD

The present disclosure relates to an information processing apparatus, an information processing method, and a program.

BACKGROUND ART

Devices presenting stereoscopically viewable images to users have been used for the purpose of allowing videos to be watched with realism, allowing users to perform accurate observation, and the like. For example, techniques for imparting a binocular parallax to a user by presenting different images to the right eye and the left eye of the user are known.

On the other hand, for example, images may not be fused depending on binocular parallaxes imparted to users, and thus it may be difficult to perform comfortable stereoscopic viewing. Consequently, for example, Patent Literature 1 discloses a head mounted display that performs switching between a 3D mode in which different images are presented to the right and left eyes of a wearing person and a 2D mode in which the same image is presented to the right and left eyes of the wearing person, in accordance with the motion of the wearing person's head.

CITATION LIST

Patent Literature

Patent Literature 1: JP 2011-205358A

DISCLOSURE OF INVENTION

Technical Problem

In the above-described technique, it is desirable to more flexibly impart a binocular parallax to a user.

Solution to Problem

According to the present disclosure, there is provided an information processing apparatus including: a control unit that determines a display method for an object in a virtual space on a basis of a positional relationship between the object and a viewpoint. A binocular parallax regarding the object which is to be imparted to a user varies depending on the determined display method.

In addition, according to the present disclosure, there is provided an information processing method including: determining a display method for an object in a virtual space by a processor on a basis of a positional relationship between the object and a viewpoint. A binocular parallax regarding the object which is to be imparted to a user varies depending on the determined display method.

In addition, according to the present disclosure, there is provided a program causing a computer to realize: a function of determining a display method for an object in a virtual space on a basis of a positional relationship between the object and a viewpoint; and a function of performing control so that a binocular parallax regarding the object which is to be imparted to a user varies depending on the determined display method.

Advantageous Effects of Invention

As described above, according to the present disclosure, it is possible to more flexibly impart a binocular parallax to a user.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
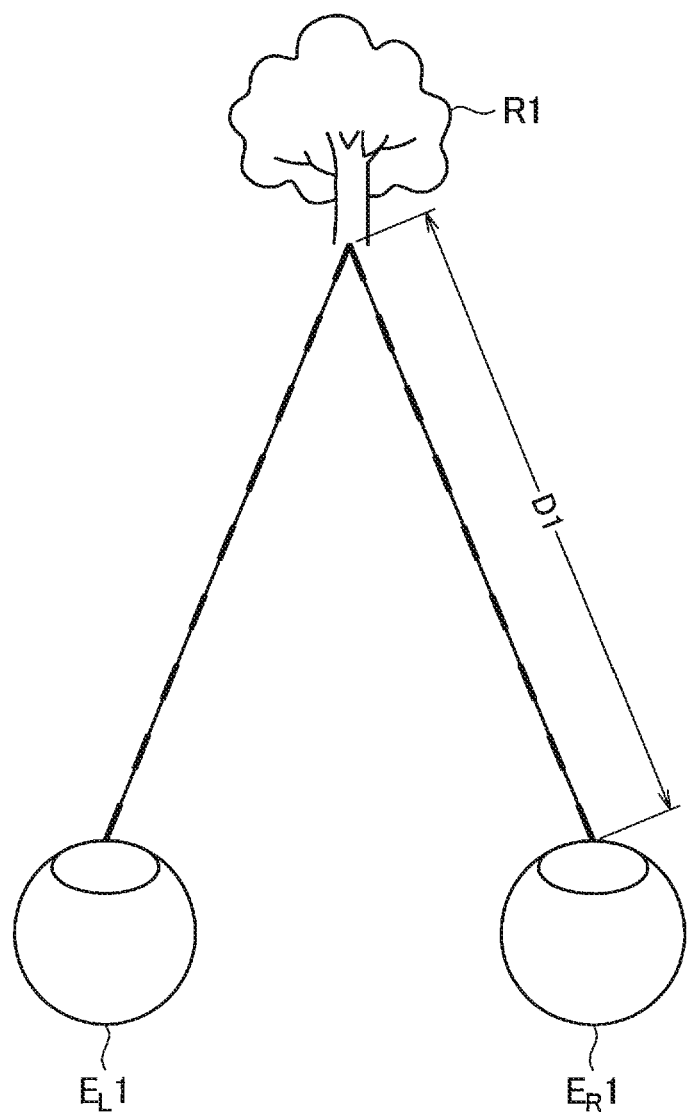
FIG. 1 is a diagram illustrating an adjustment distance and a convergence distance in natural vision.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that a description will be given in the following order.

<<1. Background>>
<<2. Outline>>
<<3. Configuration example>>
<<4. Operation example>>
<<5. Application examples>>
<5-1. Application example 1>
<5-2. Application example 2>
<5-3. Application example 3>
<<6. Hardware configuration example>>
<<7. Conclusion>>

1. BACKGROUND

In describing an information processing apparatus according to an embodiment of the present disclosure, first, the background leading to the creation of the information processing apparatus according to the embodiment of the present disclosure will be described with reference to the accompanying drawings.

In a case in which a binocular parallax is imparted by presenting different images to the right and left eyes of a user, for example, images may not be fused depending on the magnitude of the binocular parallax or the like, and thus it may be difficult to perform comfortable stereoscopic viewing. The cause of the difficulty in performing comfortable stereoscopic viewing is inconsistency between an adjustment distance in focus adjustment using a crystalline lens and a convergence distance in binocular convergence.

In general, the adjustment distance is a distance between an eye and a real object or a focal distance in an optical system of a display. In addition, the convergence distance is a distance between an eye and a position where lines of vision of both eyes according to a binocular parallax intersect each other.

Hereinafter, binocular stereoscopic viewing will be described with reference to FIGS. 1 to 3. FIG. 1 is a diagram illustrating an adjustment distance and a convergence distance in natural viewing of a real object. As illustrated in FIG. 1, in a case in which a real object R1 is viewed by a left eye $E_L1$ and a right eye $E_R1$, an adjustment distance and a convergence distance are consistent with each other as indicated by a distance D1 illustrated in FIG. 1.

Figure 2:
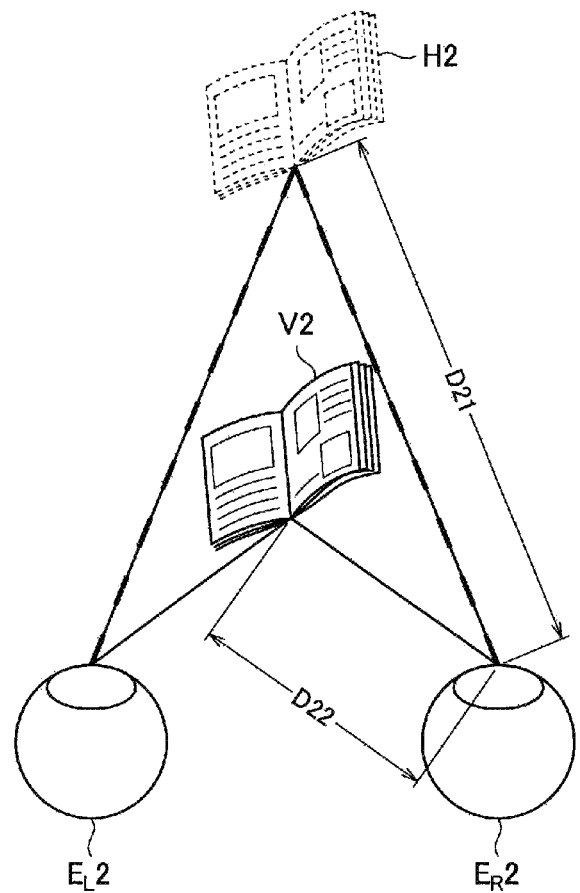
FIG. 2 is a diagram illustrating an adjustment distance and a convergence distance in binocular stereoscopic viewing.

FIG. 2 is a diagram illustrating an adjustment distance and a convergence distance in binocular stereoscopic viewing in which different images are presented to right and left eyes through a display. As illustrated in FIG. 2, for example, the adjustment distance is a distance D21 between the position of an image H2 on the display and a right eye $E_R2$. On the other hand, the convergence distance is a distance D22 between the right eye $E_R2$ and the position of an object V2 perceived by the user with the lines of vision of a left eye $E_L2$ and the right eye $E_R2$ intersecting each other in accordance with an image presented to the right and left eyes.

That is, as illustrated in FIG. 2, in binocular stereoscopic viewing in which different images are presented to the right and left eyes, inconsistency between an adjustment distance and a convergence distance may occur. The magnitude of the inconsistency between the adjustment distance and the convergence distance (the magnitude of a difference between the adjustment distance and the convergence distance) tends to increase as the magnitude of a binocular parallax between the images presented to the right and left eyes becomes larger. In a case in which the inconsistency between the adjustment distance and the convergence distance is large, for example, the images reflected in the right and left eyes are not fused and are not recognized as one image, which leads to a concern that the user may feel uncomfortable.

Figure 3:
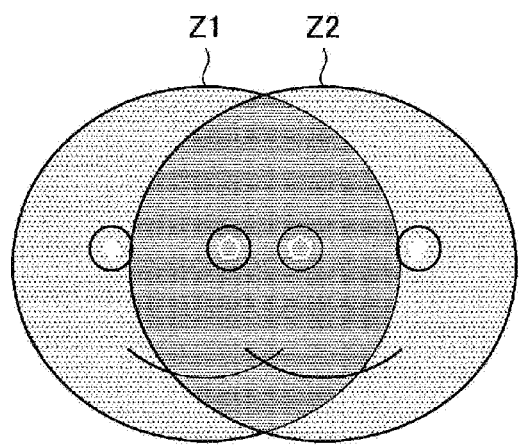
FIG. 3 is an image diagram of a phenomenon in which images are not fused.

FIG. 3 is an image diagram of a phenomenon in which images are not fused. In a case in which images are not fused, an image Z1 and an image Z2 are recognized as separate images as illustrated in FIG. 3, and it looks as if an image is divided into two parts. When a phenomenon in which images are not fused occurs as illustrated in FIG. 3, it is difficult to comfortably observe the images.

In a case in which a user wears a mounted display such as a head mounted display (HMD), an image may be presented following the movement of the user's head, and thus it is difficult to intentionally avoid the above-described phenomenon through an act such as the user averting his or her eyes.

Consequently, the present embodiment has been created focusing on the above-described circumstances. According to the present embodiment, it is possible to flexibly impart a binocular parallax to a user and perform more comfortable observation by switching a method of displaying an object in a virtual space on the basis of a positional relationship between the object and a viewpoint. Hereinafter, an outline of the embodiment of the present disclosure having such an effect will be described.

2. OUTLINE

Figure 4:
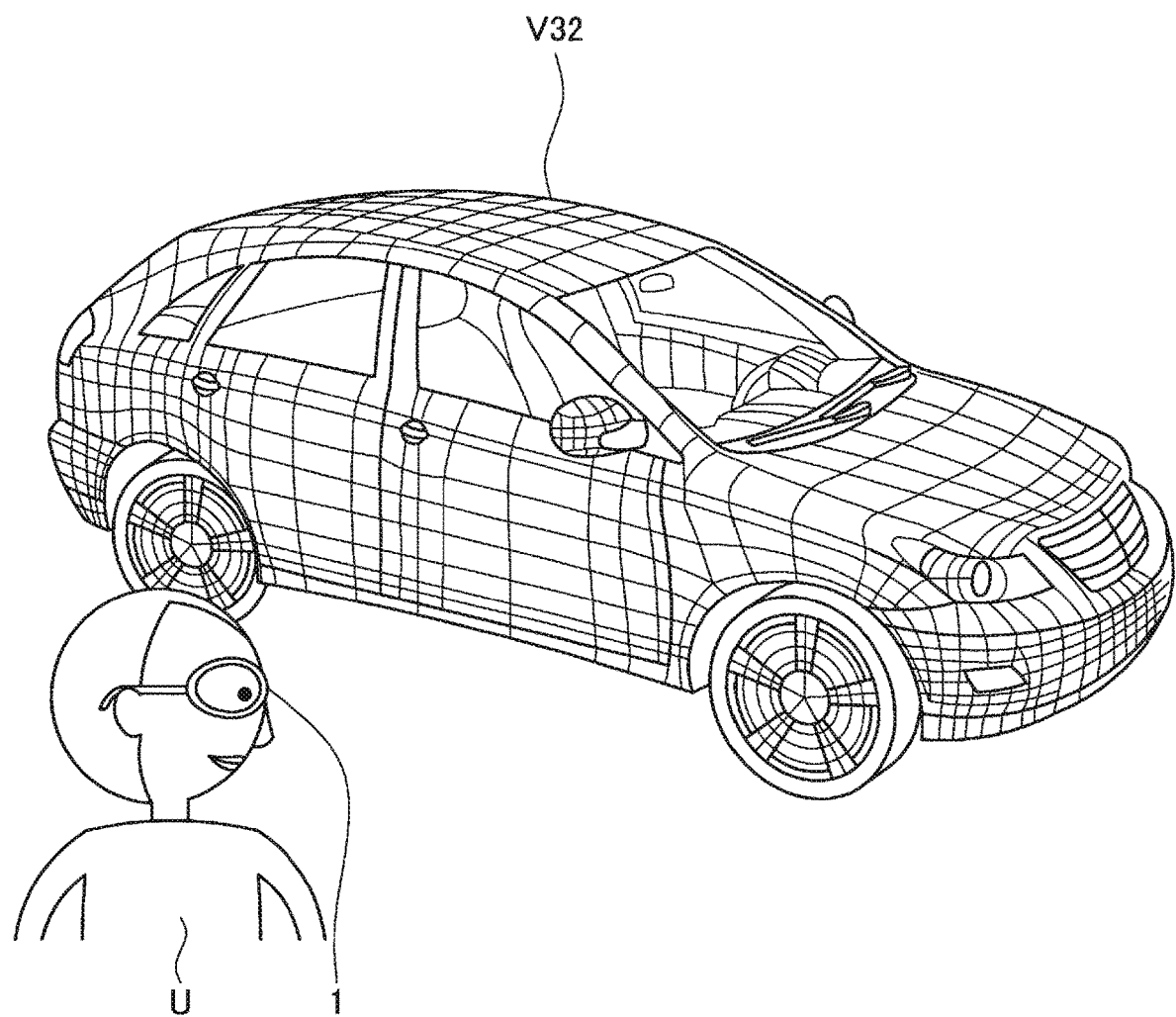
FIG. 4 is a conceptual diagram illustrating an outline of an information processing apparatus according to an embodiment of the present disclosure.
Figure 5:
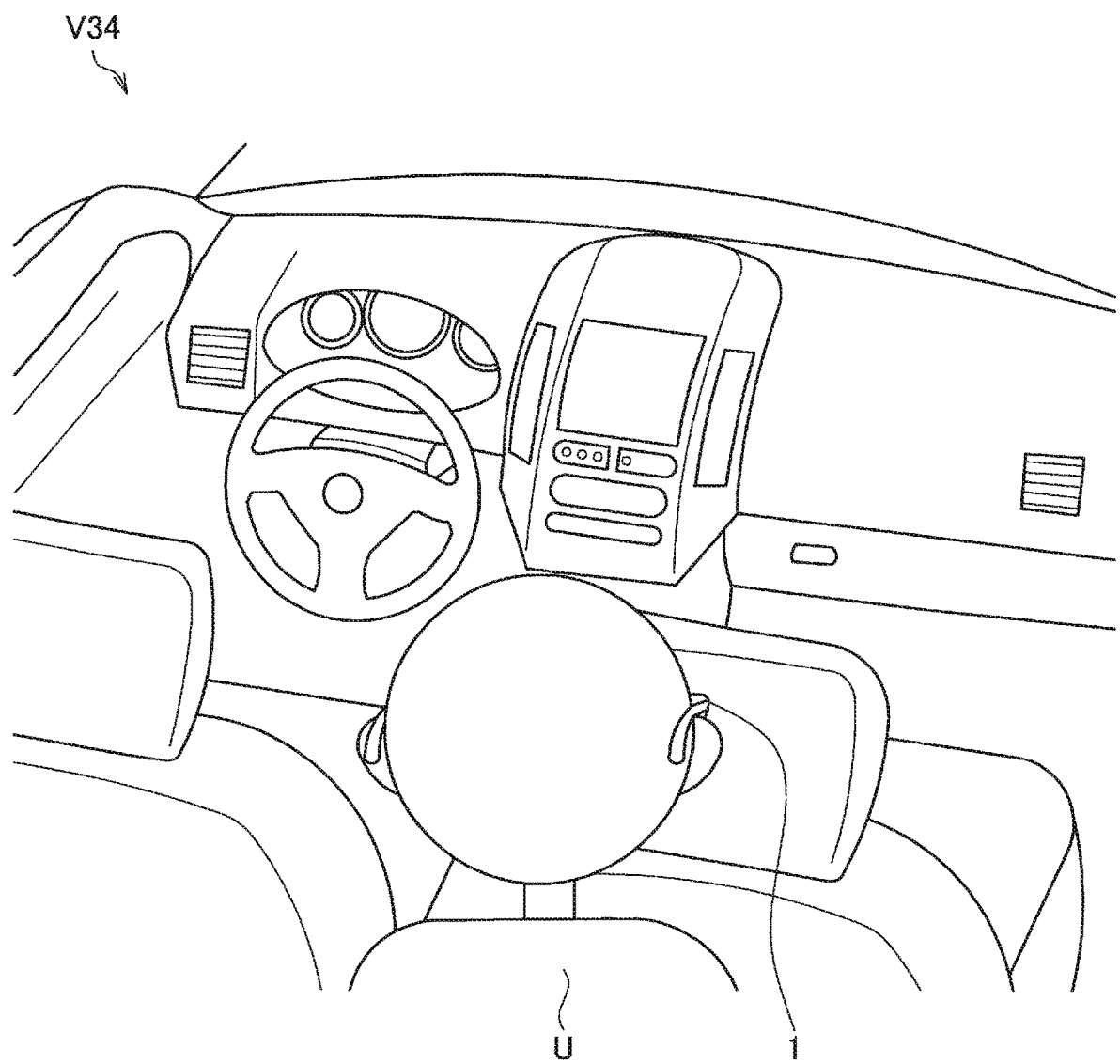
FIG. 5 is a conceptual diagram illustrating an outline of the information processing apparatus according to the embodiment.

Hereinafter, an outline of the information processing apparatus according to the embodiment of the present disclosure will be described with reference to FIGS. 4 and 5, and a detailed configuration of the information processing apparatus according to the present embodiment will be described later with reference to FIG. 6. FIGS. 4 and 5 are conceptual diagrams illustrating an outline of the information processing apparatus according to the embodiment of the present disclosure. In an example illustrated in FIG. 4, an information processing apparatus 1 according to the present embodiment is a spectacles-type HMD including a transmissive display unit. In the example illustrated in FIG. 4, the information processing apparatus 1 provides an application for a creator for observing a virtual object to a user U.

The position of a virtual object V32 in a virtual space may be specified on the basis of, for example, a real space recognized by the information processing apparatus 1. In addition, the position of a viewpoint regarding rendering in the virtual space for generating an image to be presented to the user U may be specified on the basis of the position of the user U recognized by the information processing apparatus 1, or may be, for example, a position in the virtual space corresponding to the position of the user. With such a configuration, for example, the user U can perform observation while changing a distance from the object V32 or changing an angle by moving from an own position. In addition, the user U can also observe the internal state of the object V32 by moving a viewpoint so as to enter the object V32.

The information processing apparatus 1 may impart a binocular parallax larger than 0 to the user U by presenting different images to the right and left eyes of the user U. or may set a binocular parallax to be imparted to the user U to 0 by presenting the same image to the right and left eyes of the user U. In a case in which a binocular parallax larger than 0 is imparted to the user U, the user U can perform binocular stereoscopic viewing. However, as described above, when a binocular parallax to be imparted is excessively large, it may be difficult to perform comfortable binocular stereoscopic viewing.

For example, in a case in which the object V32 and the user U are separated from each other by a sufficient distance, a binocular parallax regarding the object V32 to be imparted to the user U is reduced, and thus the user can easily perform comfortable binocular stereoscopic viewing. In such a case, the information processing apparatus 1 may generate an image for the right eye and an image for the left eye by rendering the object V32 using two viewpoints in a virtual space corresponding to both eyes of the user U as rendering viewpoints so that the user U can perform binocular stereoscopic viewing. As a result, as illustrated in FIG. 4, the user U can perform binocular stereoscopic viewing of the object V32.

On the other hand, when a distance between the object V32 and the user U is small, a binocular parallax regarding the object V32 to be imparted to the user U is increased. Particularly, when a viewpoint enters the object V32 due to the movement of the user U, a binocular parallax to be imparted to the user U rapidly increases, which leads to a concern that it may be difficult to perform comfortable observation.

FIG. 5 is an image diagram in a case in which a viewpoint is inside an object. As illustrated in FIG. 5, in a case in which a viewpoint enters the object V32, the user U can observe an internal state V34 of the object V32. Here, the information processing apparatus 1 may switch a display method so as to reduce a binocular parallax to be imparted to the user U at a timing when the viewpoint enters the object V32 due to the movement of the user U.

For example, the information processing apparatus 1 may switch a display method so that the same image is presented to the right and left eyes of the user U at a timing when the viewpoint enters the object V32 due to the movement of the user U. A binocular parallax to be imparted to the user U is set to 0 by such a display method, and thus the user U can comfortably perform observation without getting a feeling of discomfort due to the binocular parallax.

In addition, the information processing apparatus 1 may impart a movement parallax according to the movement of the head of the user U to the user U, regardless of the switching of the above-described display method, and may perform display in which, for example, parsing changes in accordance with the movement of the head. In addition, the information processing apparatus 1 may perform display in which a shielding (occlusion) relationship between a real space and an object is matched regardless of the switching of the above-described display method. For example, it is possible to generate and display an image exhibiting the above-described effects by rendering the internal state V34 using one viewpoint positioned between two viewpoints corresponding to both eyes of the user U as a rendering viewpoint. With such a configuration, the user U can perform observation with a stereoscopic effect, even when binocular stereoscopic viewing cannot be performed.

The outline of the information processing apparatus 1 according to the present embodiment has been described above. Note that the switching of the above-described display method is an example, and the information processing apparatus 1 according to the present embodiment may perform the switching of a display method using various methods, or may perform display through various display methods.

3. CONFIGURATION EXAMPLE

Next, a configuration example of the information processing apparatus 1 according to the present embodiment will be described. FIG. 6 is a block diagram illustrating a configuration example of the information processing apparatus 1 according to the present embodiment. As illustrated in FIG. 6, the information processing apparatus 1 according to the present embodiment is an information processing apparatus including a control unit 10, a communication unit 11, a rear camera 12, a front camera 13, a microphone 14, a gyro sensor 15, an acceleration sensor 16, a speaker 17, a display unit 18, and a storage unit 19.

The information processing apparatus 1 according to the present embodiment may be realized in various forms such as a Head Mounted Display (HMD), a Personal Computer (PC), a mobile phone, a smartphone, a tablet PC, and a projector. Note that, hereinafter, as illustrated in FIG. 4, 5, a case in which the information processing apparatus 1 according to the present embodiment is a spectacles-type HMD including a transmissive display unit and is worn on a user's head will be described as an example.

The control unit 10 controls each component of the information processing apparatus 1. For example, the information processing apparatus 1 can provide various applications to the user under the control of the control unit 10.

Figure 6:
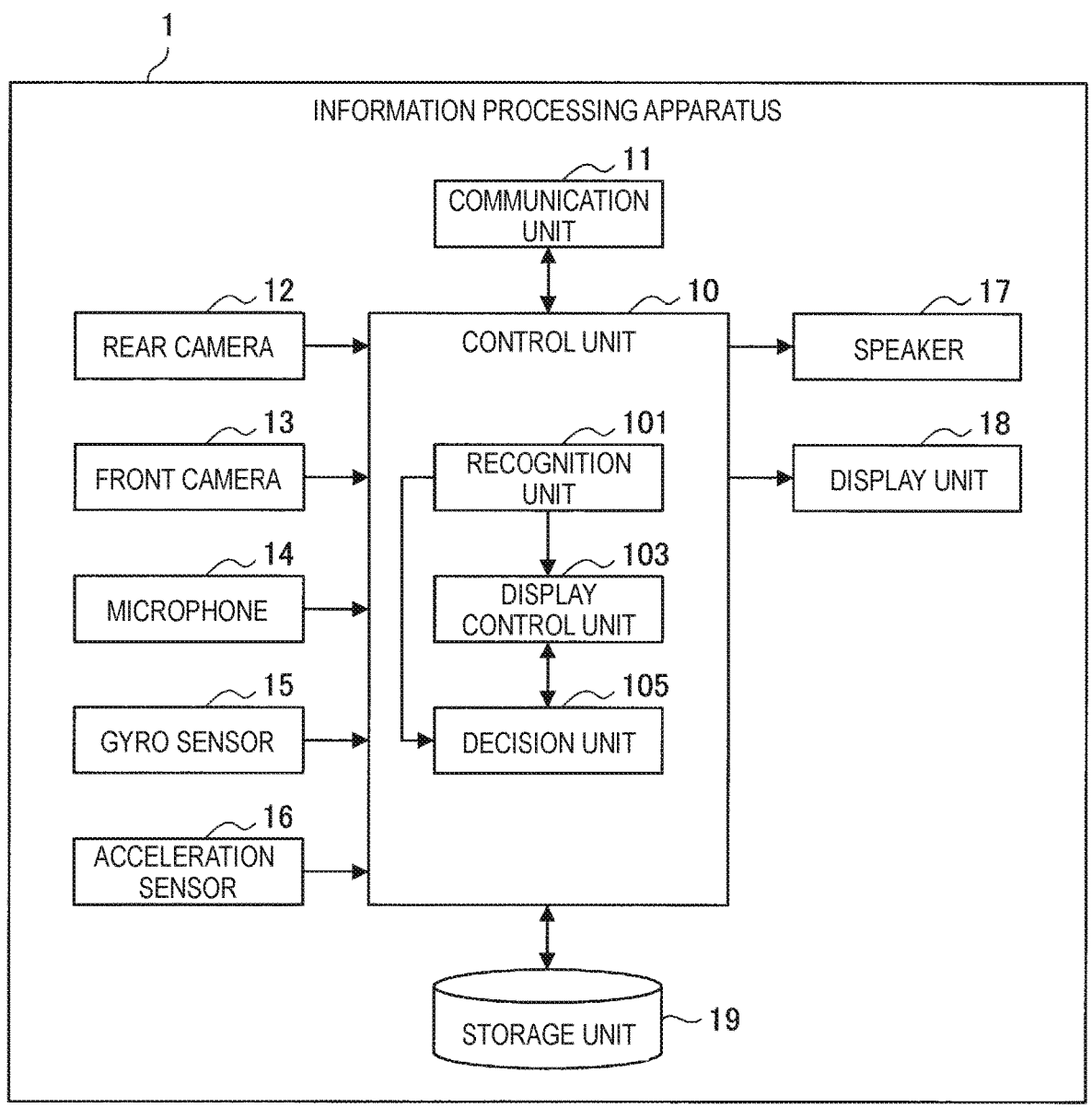
FIG. 6 is a block diagram illustrating a configuration example of an information processing apparatus 1 according to the embodiment.

In addition, as illustrated in FIG. 6, the control unit 10 also functions as a recognition unit 101, a display control unit 103, and a determination unit 105.

The recognition unit 101 performs various recognition processes on the basis of information acquired by the rear camera 12, the front camera 13, the microphone 14, the gyro sensor 15, and the acceleration sensor 16 to be described later, and acquires information.

For example, the recognition unit 101 performs a stereo matching method, a Simultaneous Localization and Mapping (SLAM) method, or the like on the basis of an image acquired by the rear camera 12, or the like to acquire real space information and information regarding the position of the user's head in the real space.

In addition, the recognition unit 101 acquires line-of-vision information regarding the line of vision of the user on the basis of an eye image of the user which is acquired by the front camera 13. The line-of-vision information according to the present embodiment may include, for example, the direction of the line of vision of the user, the position of the line of vision of the user, a focus position, and the like. In addition, the position of the line of vision of the user may be, for example, a position (for example, a coordinate position) where the display unit 18 and the line of vision of the user intersect each other in the display unit 18.

The recognition unit 101 may detect a reference point of an eye (for example, a point corresponding to an immovable portion of the eye such as the top of the eyeball or corneal reflex) and a moving point of the eye (for example, a point corresponding to a movable portion of the eye such as the iris or the pupil) from the information acquired by the front camera 13. In addition, the recognition unit 101 may acquire line-of-vision information regarding the user on the basis of the position of the moving point of the eye with respect to the reference point of the eye. Note that a method of acquiring line-of-vision information by the recognition unit 101 according to the present embodiment is not limited to the above-described methods, and the acquisition may be performed, for example, by any line-of-vision detection technique capable of detecting a line of vision.

In addition, the recognition unit 101 may recognize the user's voice on the basis of a sound signal acquired by the microphone 14. In addition, the recognition unit 101 may acquire information regarding the posture of the user (the posture of the head) and the user's motion (for example, the speed of the user, or the like), on the basis of sensor information acquired by the gyro sensor 15 and the acceleration sensor 16, and the like. Further, the recognition unit 101 may perform an action recognition process on the basis of the user's voice, the sensor information, and the like to acquire action information regarding the user.

The above-described recognition processes performed by the recognition unit 101 are examples, and are not limited thereto. The recognition unit 101 may recognize information such as various contexts, on the basis of various sensors included in the information processing apparatus 1, conditions of an application provided by the information processing apparatus 1, information acquired from the communication unit 11, and the like.

The display control unit 103 has a display control function for controlling display to be performed by the display unit 18. The display control unit 103 may cause information (for example, time information or the like) to be displayed at a predetermined position in the display unit 18. In addition, the display control unit 103 may cause a virtual object to be displayed on the basis of real space information acquired by the recognition unit 101.

For example, the display control unit 103 may specify the position of an object in a virtual space corresponding to a real space so that the object is perceived to be present at a predetermined position (for example, on a detected plane) in the real space on the basis of the real space information. In addition, the display control unit 103 may perform rendering on the basis of the position of the object in the virtual space and a rendering viewpoint to be described later to generate an image for the left eye and an image for the right eye to be displayed on the display unit 18.

Note that the display control unit 103 may perform display control so that the object is shielded by the real space on the basis of a positional relationship between the rendering viewpoint and the object, thereby matching a shielding relationship so that the user can perceive the object to be present at the predetermined position in the real space. For example, in a case in which a real object is present in a real space equivalent to a position between the position of the object in the virtual space and the position of the rendering viewpoint, the object is displayed so as to be hidden by the real object.

In addition, the display control unit 103 specifies a viewpoint (a viewpoint for display method determination) which is used to determine a display method by the determination unit 105 to be described later, on the basis of the position of the user. For example, the display control unit 103 may specify two viewpoints corresponding to both eyes of the user in the virtual space as the viewpoint for display method determination, on the basis of the position of the user's head.

In addition, the display control unit 103 may generate an image to be displayed on the display unit 18 by rendering the object with a rendering viewpoint specified according to the display method determined by the determination unit 105 to be described later. Hereinafter, a first display method, a second display method, and a third display method will be described as an example of a display method according to the present embodiment.

In the first display method, the display control unit 103 may render the object using two viewpoints (the above-described viewpoint for display method determination) corresponding to both eyes of the user in the virtual space as rendering viewpoints, on the basis of the position of the user's head. According to the first display method, a binocular parallax is imparted to the user according to a theoretical value of binocular stereoscopic viewing, and the binocular stereoscopic viewing can be performed so that the object is present at the above-described position of the object.

In the second display method, the display control unit 103 may perform display control so that a binocular parallax smaller than the binocular parallax imparted to the user in the first display method is imparted to the user. For example, in the second display method, the display control unit 103 may generate an image for the left eye and an image for the right eye by rendering the object using two points between two viewpoints for display method determination which are specified as described above as rendering viewpoints.

According to the second display method, a reduced binocular parallax is imparted to the user, and thus the user can easily perform more comfortable binocular stereoscopic viewing. In addition, according to the rendering in the above-described second display method, it is possible to impart a movement parallax based on the movement of the user's head and to perform display control so that a shielding relationship between the real space and the object is matched. Therefore, the user easily perceives (an illusion) the object to be present at the above-described position of the object in the real space, even when an imparted binocular parallax is reduced.

Note that, in the second display method, a binocular parallax may be reduced as an interval between the above-described two rendering viewpoints decreases. A method of determining an interval between two rendering viewpoints will be described later.

In the third display method, the display control unit 103 may perform display control so that the same image is presented to the right and left eyes of the user. For example, in the third display method, the display control unit 103 may generate an image for the left eye and an image for the right eye by rendering the object using one point between two viewpoints for display method determination which are specified as described above as a rendering viewpoint. Note that the rendering viewpoint may be, for example, an intermediate point between the two viewpoints for display method determination, or may be any one viewpoint for display method determination.

According to the third display method, a binocular parallax to be imparted to the user is set to 0, and thus the user can comfortably observe the object without getting a feeling of discomfort due to the binocular parallax. In addition, according to the rendering in the above-described third display method, it is possible to impart a movement parallax according to the movement of the head of the user and to perform display control so that a shielding relationship between the real space and the object is matched. Therefore, the user easily perceives (misunderstands) the object to be present at the above-described position of the object in the real space, even when an imparted binocular parallax is 0.

Note that the above-described third display method may be included in the second display method. For example, a case in which an interval between two rendering viewpoints used in the rendering in the above-described second display method is 0 is equivalent to the above-described third display method.

In addition, the display control unit 103 may perform display control so that smooth display transition is performed in a case in which a display method is switched (for example, any one display method of the above-described display methods is switched to another display method). For example, the display control unit 103 may increase the transmittance of the object and may decrease visibility when switching a display method.

Further, in a case in which the object once deviated from an angle of view is included in the angle of view again and the second display method is determined, the display control unit 103 may impart a binocular parallax serving as a key to the user by the third display method and then display the object by the second display method.

In addition, the display control unit 103 may perform display control so that the user performs stereoscopic viewing more easily. For example, in a case in which the user's motion is large, the display control unit 103 may blurredly display letters (an example of an object) so that the user does not lose a binocular parallax, and may display letters without blurring while performing animation when the user's motion is stopped.

In addition, an object for which it is difficult to perform binocular stereoscopic viewing (for example, an object with little texture and an object with a recursive pattern) may be displayed by adding a feature point, such as a point, a letter, or continuity from the front of the object, which serves as a key of binocular stereoscopic viewing to the object.

The determination unit 105 has a function of determining a method of displaying an object on the basis of a positional relationship between an object in a virtual space and a viewpoint for display method determination. As described above, the display control unit 103 causes the object (performs display control) to be displayed by a display method according to the display method determined by the determination unit 105, and thus a binocular parallax regarding the object to be imparted to the user may vary.

For example, the determination unit 105 may determine a display method on the basis of a distance between the object and a viewpoint for display method determination in a virtual space, or may determine a display method on the basis of comparison between the distance and a threshold value.

For example, the determination unit 105 may determine the above-described second display method (including the third display method) as a display method in a case in which the distance is less than the threshold value, or may determine the above-described first display method as a display method in a case in which the distance is equal to or greater than the threshold value.

According to such a configuration, in a case in which the distance is small and a binocular parallax tends to be increased, a display method in which the binocular parallax becomes smaller is determined, thereby making it easier for the user to perform more comfortable observation. For example, in a case in which the information processing apparatus 1 provides an application such as a game, and objects having effects, such as rain and snow, which surround all directions of the user are displayed, the binocular parallax of an object close to the user may be reduced.

Note that, in a case in which the above-described second display method is determined as a display method on the basis of the distance, rendering viewpoints may be specified so that an interval between the rendering viewpoints is reduced as the distance becomes smaller. According to such a configuration, in a case in which the distance tends to become smaller and the binocular parallax tends to become larger, display control is performed so that the binocular parallax is further reduced, thereby making it easier for the user to perform more comfortable observation.

In addition, the determination unit 105 may dynamically set the threshold value in accordance with a speed such as the speed of the user, the speed of a viewpoint for display method determination, or the relative speed of the object with respect to the viewpoint for display method determination, or the threshold value may be set to be large in a case in which the speed is high. According to such a configuration, in a case in which it is difficult for the user to fix his or her eyes on the object due to a high moving speed, such as a case in which the user is on a vehicle or a bicycle, a binocular parallax is easily reduced.

Note that the setting of the threshold value performed by the determination unit 105 is not limited to setting based on the above-described speed, and may be performed on the basis of, for example, the surrounding environment, the user's action, an application, a context, or the like.

For example, the determination unit 105 may set two threshold values so that the switching of a display method has hysteresis. According to such a configuration, it is difficult to switch a display method with a slight variation in the distance, and thus the user can perform more comfortable observation.

In addition, the determination unit 105 may set threshold values by different methods in a case in which the distance changes by the movement of the object (an example of an application) and a case in which the distance changes by the movement of the user (an example of the user's action). For example, in a case in which the distance changes by the movement of the user, two threshold values may be set so that the switching of a display method has hysteresis. Further, in a case in which the distance changes by the movement of the object, one threshold value may be set so that the switching of a display method does not have hysteresis.

Further, in a case in which the movement of the user's head is large in a horizontal direction (an example of the user's action), the determination unit 105 may set the threshold value to be large or small. According to such a configuration, in a case in which a movement parallax perceived by the user is large, it is difficult to switch a display method, and thus the perception of the position of the object by the user is hardly disturbed.

Note that, although a threshold value may be set in various manners as described above, a distance at which human beings can generally perceive a depth through a binocular parallax is approximately 10 meters, and thus the threshold value may be set in consideration of such a distance.

In addition, as described above with reference to FIGS. 4 and 5, the determination unit 105 may set different display methods in a case in which a viewpoint for display method determination is inside an object and a case in which the viewpoint is outside the object.

For example, the determination unit 105 may determine the second display method (including the third display method) as a display method in a case in which the viewpoint for display method determination is inside the object, and may determine the first display method as a display method in a case in which the viewpoint is outside the object.

According to such a configuration, in a case in which a binocular parallax tends to be rapidly increased by the viewpoint moving into the object, a display method in which the binocular parallax becomes smaller is determined, thereby making it easier for the user to perform more comfortable observation. In addition, in a case in which the viewpoint moves from the outside to the inside of the object, a sense of distance and a scene are easily changed, and thus it is difficult to give a sense of incongruity to the user even when the display method is switched.

In addition, the determination unit 105 may make the transition of a display method different between a case in which a viewpoint for display method determination moves from the outside to the inside of the object and a case in which the viewpoint moves from the outside to the inside of the object. For example, in a case in which the viewpoint for display method determination moves from the outside to the inside of the object, the third display method is determined as a display method, and the number of rendering viewpoints may be one. That is, in a case in which the viewpoint for display method determination moves from the outside to the inside of the object, a binocular parallax to be immediately imparted to the user is set to 0.

On the other hand, in a case in which the viewpoint for display method determination moves from the inside to the outside of the object, a display method may be determined so that display is performed by the third display method after an interval between rendering viewpoints in the second display method is gradually increased. According to such a configuration, a binocular parallax to be imparted to the user is gradually increased, and thus a load to be applied to the user is reduced.

In addition, the determination unit 105 may determine a display method on the basis of line-of-vision information regarding the user. For example, the determination unit 105 may determine the second display method (including the third display method) as a display method in a case in which the user is not viewing the object (the line of vision of the user is not directed), and may determine the first display method as a display method in a case in which the user is viewing the object. According to such a configuration, a binocular parallax regarding the object not viewed by the user is reduced, thereby making it difficult for the user to receive a load due to binocular stereoscopic viewing regarding the object not noticed by the user.

The communication unit 11 is a communication interface that mediates communication with other devices. The communication unit 11 supports any wireless communication protocol or wired communication protocol, and establishes communication connection with other devices through a communication network not shown in the drawing. Thereby, for example, the information processing apparatus 1 can acquire information regarding the object, or can perform communication for providing various applications to the user.

The rear camera 12 is a camera oriented in a direction of a field of view of the user. In addition, the front camera 13 is a camera for acquiring an eye image of the user. Each of the rear camera 12 and the front camera 13 may include a plurality of cameras.

The microphone 14 acquires sound in the vicinity of the information processing apparatus 1. In addition, the gyro sensor 15 and the acceleration sensor 16 acquire sensor information regarding the posture and motion of the information processing apparatus 1.

The speaker 17 converts a sound signal into sound and outputs the sound under the control of the control unit 10. In addition, the display unit 18 performs display under the control of the display control unit 103. The display unit 18 may be, for example, a transmissive type (optical see-through type) display and a binocular spectacles-type display. With such a configuration, the display control unit 103 can impart a binocular parallax in which the object is perceived to be present at any three-dimensional position in a real space to the user.

The storage unit 19 stores programs and parameters for causing each component of the information processing apparatus 1 to function. For example, the storage unit 19 may store information regarding an object to be displayed by the display control unit 103.

The configuration of the information processing apparatus 1 according to the present embodiment has been specifically described above. Note that the configuration illustrated in FIG. 6 is an example, and the present embodiment is not limited thereto. For example, the information processing apparatus 1 may further include an infrared (IR) camera, a depth camera, a human sensor, or the like in order to acquire information regarding the surrounding environment. In addition, each function of the control unit 10 according to the present embodiment may be on a cloud connected through the communication unit 11.

4. OPERATION EXAMPLE

Figure 7:
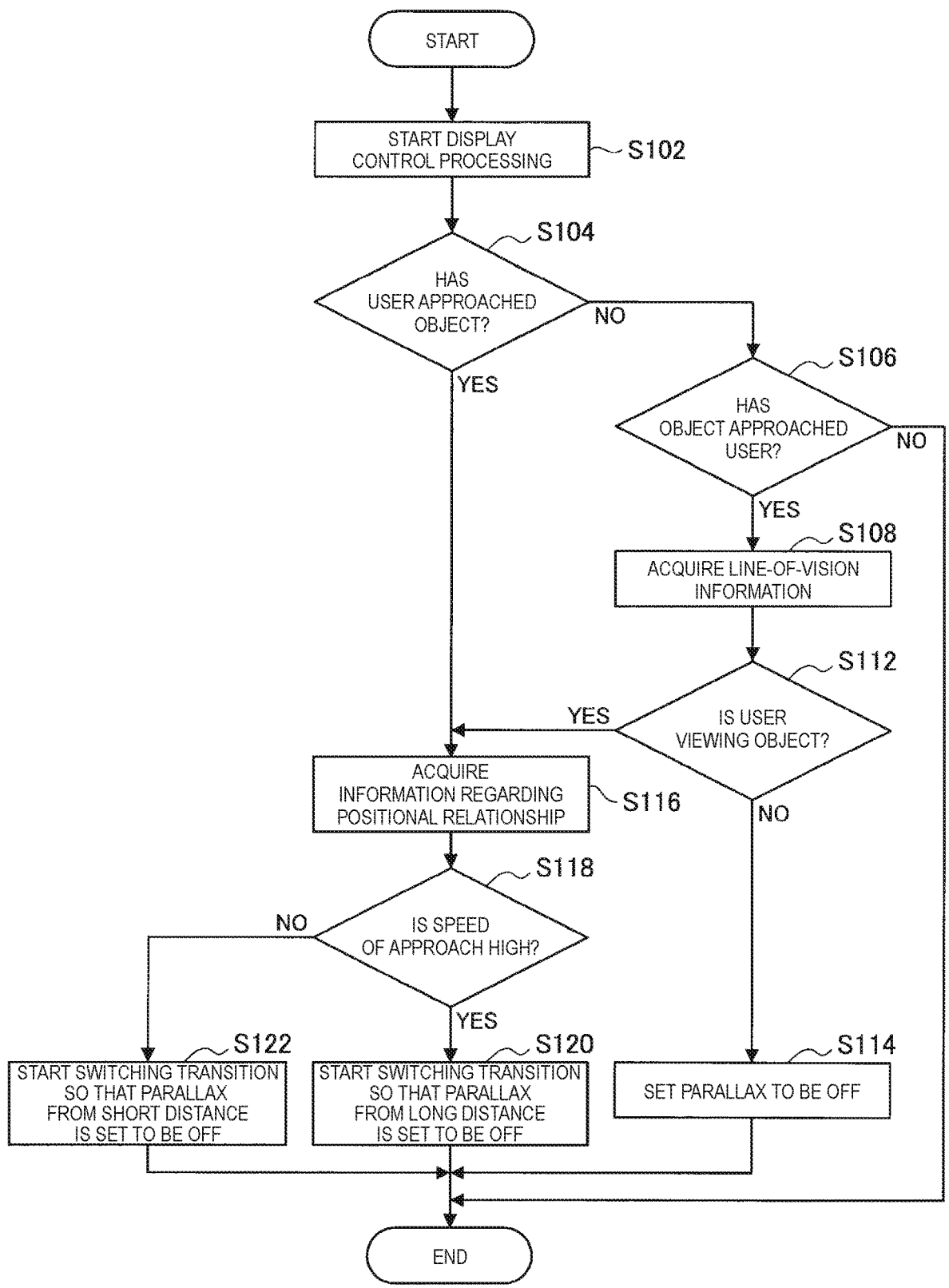
FIG. 7 is a flowchart illustrating an operation example according to the embodiment.

Next, an operation example according to the present embodiment will be described with reference to FIG. 7. FIG. 7 is a flowchart illustrating an operation example according to the present embodiment.

First, display control processing of the display control unit 103 is started on the basis of recognition results obtained by the recognition unit 101, and an object is displayed (S102). In step S102, the object may be displayed, for example, by the above-described first display method.

Next, the determination unit 105 determines whether or not a user (a viewpoint corresponding to the user) has moved and approached the object (S104). In a case in which the user has not moved and not approached the object (NO in S104), the determination unit 105 determines whether or not the object has moved and approached the user (S106). In a case in which the user has moved and not approached the object and the object has not moved and not approached the user (NO in S104, and NO in S106), the processing is terminated.

On the other hand, in a case in which the object has moved and approached the user (YES in S106), line-of-vision information regarding the user is acquired (S108). Next, it is determined whether or not the user is viewing the object on the basis of the line-of-vision information (S112).

In a case in which it is determined that the user is not viewing the object (NO in S112), the third display method in which a binocular parallax to be imparted to the user is set to 0 (OFF) is determined (S114).

On the other hand, in a case in which the user has moved and approached the object (YES in S104) or it is determined that the user is viewing the object (YES in S112), information regarding a positional relationship between the object and a viewpoint for display method determination is acquired (S116).

Next, the determination unit 105 determines whether or not the speed of approach between the user and the object (the relative speed of the object with respect to the viewpoint for display method determination) is high (S118). In a case in which the speed of approach between the user and the object is high (YES in S118), the switching transition of a display method is started so that a binocular parallax regarding the object is set to 0 (OFF) even when the object is present farther (for example, approximately 3 m to 5 m) (S120). For example, in the determination of a display method based on a distance which is performed by the determination unit 105 described above, a large threshold value may be set to perform the determination of the display method.

In a case in which the speed of approach between the user and the object is low (NO in S118), the switching transition of a display method is started so that a binocular parallax regarding the object present at a shorter distance (for example, approximately 1 m to 2 m) is set to 0 (OFF) (S122). For example, in the determination of a display method based on a distance which is performed by the determination unit 105 described above, a small threshold value may be set to perform the determination of the display method.

Note that a series of processes of steps S102 to S122 described above may be repeated as needed. Further, in a case in which there are a plurality of objects to be displayed on the display unit 18, the above-described series of processes may be performed for each object, or a display method may be determined for any one object and display control processing for the entire screen may be performed in accordance with the display method. The above-described processes may be selected in accordance with, for example, an application or contents. In addition, the one object may be, for example, an object closest to a viewpoint for display method determination.

5. APPLICATION EXAMPLES

The configuration example and the operation example of the present embodiment have been described above. Next, some application examples of the present technique will be described.

5-1. Application Example 1

The above-described present embodiment can be applied to, for example, an application for a sports player or an application for watching sports. For example, in a case in which a user is watching a tennis match, a display method regarding to an object such as a score or player information may be switched in accordance with a context such as the change of sides or a break after a score is brought in.

As described above, the display method is switched in a case in which the user does not have to concentrate on the match, and thus it is possible to switch the display method without giving a great sense of incongruity to the user.

5-2. Application Example 2

The above-described present technique can also be applied to a head-up display for displaying an image on, for example, a windshield of an automobile. In such a case, a display method may be switched in accordance with, for example, a context indicating whether the automobile is traveling or stopped.

For example, in a case in which the automobile is traveling, the first display method is determined, and a binocular parallax may be imparted to the user so that another automobile traveling in front of the automobile is perceived to be present or an object is perceived to be present at a position on a road ahead of the line of vision of the user. Further, in a case in which the automobile is stopped, the third display method is determined, and a binocular parallax to be imparted to the user may be 0.

5-3. Application Example 3

The above-described present technique can also be applied to, for example, a case in which a movie is presented to the user. In such a case, a display method may be switched in accordance with presentation contents of the movie.

For example, regarding a subtitle object included in the movie, the third display method is determined, and a binocular parallax regarding subtitles to be imparted to the user may be 0. In addition, regarding a video content included in the movie, the first display method is determined, and a predetermined binocular parallax may be imparted to the user.

6. HARDWARE CONFIGURATION EXAMPLE

Figure 8:
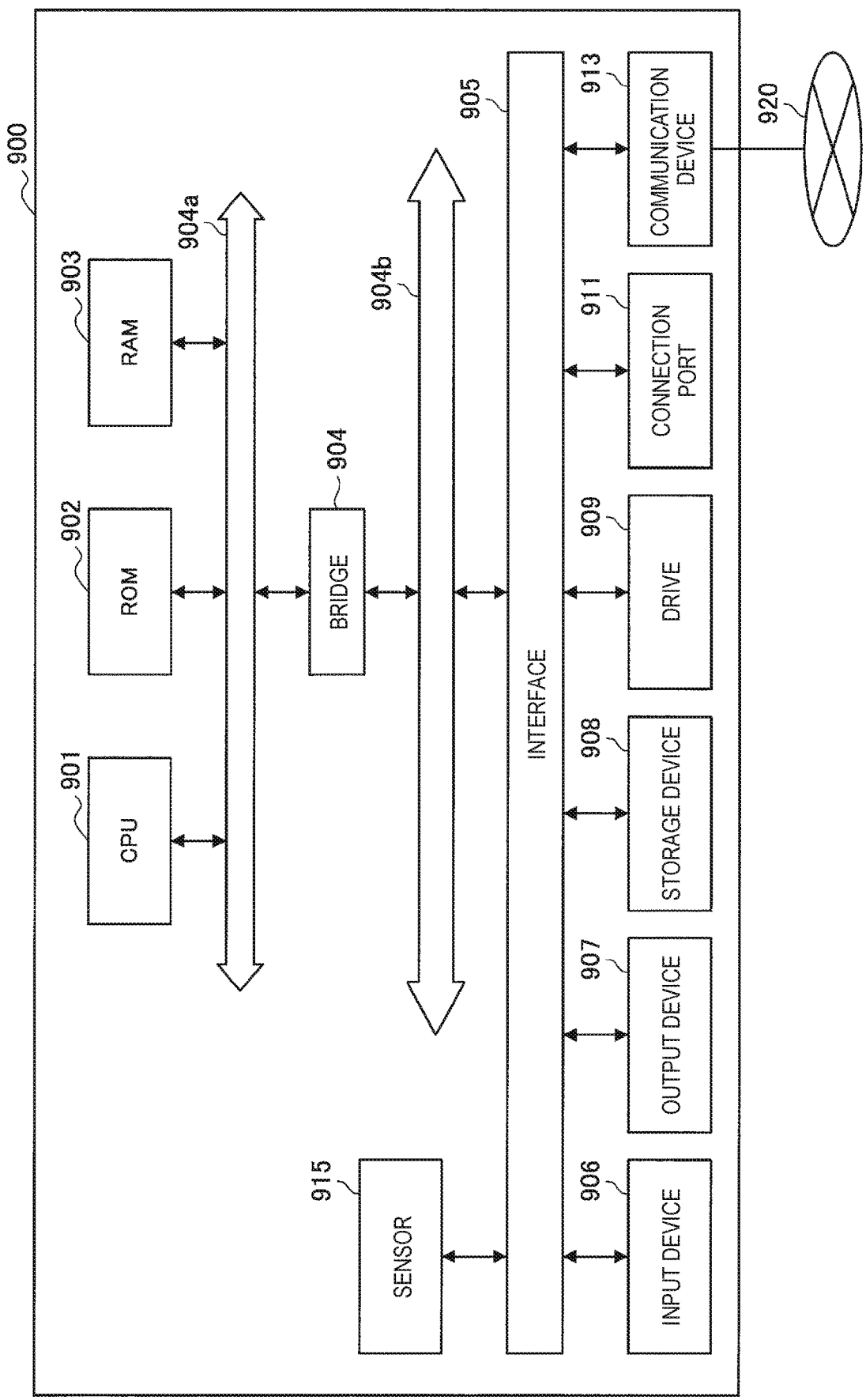
FIG. 8 is a diagram illustrating a hardware configuration example.

The embodiment of the present disclosure has been described hitherto. Finally, a hardware configuration of an information processing apparatus according to the present embodiment of the present disclosure will be described with reference to FIG. 8. FIG. 8 is a block diagram illustrating an example of the hardware configuration of the information processing apparatus according to the present embodiment of the present disclosure. Meanwhile, an information processing apparatus 900 illustrated in FIG. 8 may realize the information processing apparatus 1 illustrated in each of FIG. 6, for example. Information processing by the information processing apparatus 1 according to the present embodiment is realized according to cooperation between software and hardware described below.

As illustrated in FIG. 8, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control unit 10 illustrated in FIG. 6, for example.

The CPU 901, the ROM 902, and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904, and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The output device 907 is formed by a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals. The aforementioned display device may form the speaker 17 and the display unit 18 illustrated in FIG. 6, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information regarding the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication apparatuses according to a predetermined protocol such as, for example, TCP/IP. The communication device 913 may form the communication unit 11 illustrated in FIG. 6, for example.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900, and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device. The sensor 915 may form, for example, the rear camera 12, the front camera 13, the microphone 14, the gyro sensor 15, and the acceleration sensor 16 illustrated in FIG. 6.

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium. In addition, the above-described computer program may be distributed through, for example, a network without using a recording medium. In addition, the number of computers executing the computer program is not particularly limited. For example, a plurality of computers (for example, a plurality of servers or the like) may execute the computer program in association with each other.

7. CONCLUSION

As described above, according to the embodiment of the present disclosure, it is possible to more flexibly impart a binocular parallax to a user on the basis of various information such as a positional relationship between a viewpoint and an object, a speed, and a context.

For example, since a large binocular parallax is hardly imparted to the user, a physical load on the user is reduced, and thus the user can perform viewing and observation for a longer period of time. In addition, the user can more naturally move between a real space and a virtual space (for example, inside the object), and can easily ascertain a positional relationship by an imparted binocular parallax.

In addition, a more appropriate binocular parallax is automatically imparted even when the user does not set the amount of binocular parallax or the like, and thus the user can perform smooth viewing and observation. Further, in the presentation of information through binocular stereoscopic viewing in which individual variations tend to occur due to factors such as a skeleton and a distance between eyes, it is possible to present information that does not depend on the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, an example in which the present technique is applied to an HMD has been mainly described, but the scope of application of the present technique is not limited to such an example. For example, the present technique may be applied to a naked-eye 3D display, a 3D display using a spectacles-type device (a frame sequential system, a polarization system, or the like), a light field display, a movie theater, parallax projection mapping, and the like.

Further, in the above-described embodiment, an example of the determination of a display method in which a binocular parallax regarding convergence is different has been described, but the present technique may be applied to a display method in which a 3D element other than convergence is different. Examples of the 3D element other than convergence include a Field of View (FOV), parsing, a movement parallax, focus adjustment, comparison between the sizes of objects, and a light field (blurring, shadow expression, and the like).

Further, in the above-described embodiment, an example in which a display method regarding a sense of vision is switched has been described, but the present technique may be applied to the switching of a method regarding another sense, instead of or in addition to the switching of a display method. For example, a sound presentation method such as monaural, stereo, or surround is switched, and thus a load to be applied to a user regarding a sense of hearing may be reduced.

Further, in the above-described embodiment, an example in which an interval between two rendering viewpoints in the second display method is specified on the basis of a distance between a viewpoint and an object has been described, but the present technique is not limited to such an example. For example, an interval between the two rendering viewpoints may be specified so that an effect of reducing a binocular parallax varies depending on the certainty of recognition of the recognition unit 101.

In addition, steps in the above-described embodiment need not be always processed in chronological order in accordance with the order described as a flowchart diagram. For example, steps in the processes in the above-described embodiment may be processed in an order different from the order described as a flowchart diagram, or may be concurrently processed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)
An information processing apparatus including:
a control unit that determines a display method for an object in a virtual space on a basis of a positional relationship between the object and a viewpoint,
in which a binocular parallax regarding the object which is to be imparted to a user varies depending on the determined display method.

(2)
The information processing apparatus according to (1),
in which the control unit determines the display method on a basis of a distance between the object and the viewpoint.

(3)
The information processing apparatus according to (2),
in which the control unit determines the display method on a basis of comparison between the distance and a threshold value.

(4)
The information processing apparatus according to (3),
in which in a case in which the distance is less than the threshold value, the control unit determines a display method in which the binocular parallax becomes smaller than the binocular parallax in a display method determined in a case in which the distance is equal to or greater than the threshold value as the display method.

(5)
The information processing apparatus according to (4),
in which the threshold value is set on a basis of at least any one of a speed, an action, an application, or a context.

(6)
The information processing apparatus according to (5),
in which the speed is at least any one of a speed of the user, a speed of the viewpoint, or a relative speed of the object with respect to the viewpoint.

(7)
The information processing apparatus according to any of (1) to (6),
in which the control unit determines different display methods in a case in which the viewpoint is inside the object and a case in which the viewpoint is outside the object.

(8)
The information processing apparatus according to (7),
in which in the case in which the viewpoint is inside the object, the control unit determines a display method in which the binocular parallax becomes smaller than the binocular parallax in a display method determined in the case in which the viewpoint is outside the object as the display method.

(9)
The information processing apparatus according to any one of (1) to (8),
in which the control unit further determines the display method on a basis of line-of-vision information regarding the user.

(10)
The information processing apparatus according to (9),
in which in a case in which the user is not viewing the object, the control unit determines a display method in which the binocular parallax becomes smaller than the binocular parallax in a display method determined in a case in which the user is viewing the object as the display method.

(11)
The information processing apparatus according to (1),
in which a position of the viewpoint is a position corresponding to a position of the user.

(12)
The information processing apparatus according to any one of (1) to (11),
in which the display method determined by the control unit includes rendering the object with one rendering viewpoint specified on a basis of the viewpoint.

(13)
The information processing apparatus according to any one of (1) to (12),
in which the display method determined by the control unit includes rendering the object with two viewpoints specified on a basis of the viewpoint.

(14)
The information processing apparatus according to any one of (1) to (13),
in which the control unit performs display control so that a movement parallax according to movement of a head of the user is imparted, regardless of the display method determined by the control unit.

(15)
The information processing apparatus according to any one of (1) to (14),
in which the control unit performs display control so that a concealment relationship between a real space and the object is matched, regardless of the display method determined by the control unit.

(16)

An information processing method including:
determining a display method for an object in a virtual space by a processor on a basis of a positional relationship between the object and a viewpoint,
in which a binocular parallax regarding the object which is to be imparted to a user varies depending on the determined display method.

(17)

A program causing a computer to realize:
a function of determining a display method for an object in a virtual space on a basis of a positional relationship between the object and a viewpoint; and
a function of performing control so that a binocular parallax regarding the object which is to be imparted to a user varies depending on the determined display method.

REFERENCE SIGNS LIST 1 information processing apparatus
10 control unit
11 communication unit
12 rear camera
13 front camera
14 microphone
15 gyro sensor
16 acceleration sensor
17 speaker
18 display unit
19 storage unit
101 recognition unit
103 display control unit
105 determination unit

The invention claimed is:

1. An information processing apparatus comprising:
a control unit configured to determine a display method for an object in a virtual space on a basis of a positional relationship between the object and a viewpoint,
wherein the control unit determines different display methods based on whether the viewpoint is inside the object or outside the object,
wherein a binocular parallax regarding the object which is to be imparted to a user varies depending on the determined display method, and
wherein the control unit is implemented via at least one processor.

2. The information processing apparatus according to claim 1,
wherein the control unit determines the display method on a basis of a distance between the object and the viewpoint.

3. The information processing apparatus according to claim 2,
wherein the control unit determines the display method on a basis of comparison between the distance and a threshold value.

4. The information processing apparatus according to claim 3,
wherein the control unit determines, on a basis of the distance being smaller than the threshold value, a display method in which the binocular parallax is a first value as the display method, and
wherein the control unit determines, on a basis of the distance being equal to or greater than the threshold value, a display method in which the binocular parallax is a second value larger than the first value as the display method.

5. The information processing apparatus according to claim 4,
wherein the threshold value is set on a basis of at least any one of a speed, an action, an application, or a context.

6. The information processing apparatus according to claim 5,
wherein the speed is at least any one of a speed of the user, a speed of the viewpoint, or a relative speed of the object with respect to the viewpoint.

7. The information processing apparatus according to claim 1,
wherein the control unit determines, on a basis of the viewpoint being inside the object, a display method in which the binocular parallax is a first value as the display method, and
wherein the control unit determines, on a basis of the viewpoint being outside the object, a display method in which the binocular parallax is a second value larger than the first value as the display method.

8. The information processing apparatus according to claim 1,
wherein the control unit further determines the display method on a basis of line-of-vision information regarding the user.

9. The information processing apparatus according to claim 8,
wherein the control unit determines, on a basis of the line-of-vision information indicating that the user is not viewing the object, a display method in which the binocular parallax is a first value as the display method, and
wherein control unit determines, on a basis of the line-of-vision information indicating that the user is viewing the object, a display method in which the binocular parallax is a second value larger than the first value as the display method.

10. The information processing apparatus according to claim 1,
wherein a position of the viewpoint is a position corresponding to a position of the user.

11. The information processing apparatus according to claim 1,
wherein the display method determined by the control unit includes rendering the object with one rendering viewpoint specified on a basis of the viewpoint.

12. The information processing apparatus according to claim 1,
wherein the display method determined by the control unit includes rendering the object with two viewpoints specified on a basis of the viewpoint.

13. The information processing apparatus according to claim 1,
wherein the control unit performs display control so that a movement parallax according to movement of a head of the user is imparted, regardless of the display method determined by the control unit.

14. The information processing apparatus according to claim 1,
wherein the control unit performs display control so that a concealment relationship between a real space and the object is matched, regardless of the display method determined by the control unit.

15. An information processing method comprising:
determining a display method for an object in a virtual space by a processor on a basis of a positional relationship between the object and a viewpoint, wherein different display methods are determined based on whether the viewpoint is inside the object or outside the object, and wherein a binocular parallax regarding the object which is to be imparted to a user varies depending on the determined display method.

16. A non-transitory computer-readable medium having embodied thereon a program which when executed by a computer causes the computer to execute a method, the method comprising:

determining a display method for an object in a virtual space on a basis of a positional relationship between the object and a viewpoint; and performing control so that a binocular parallax regarding the object which is to be imparted to a user varies depending on the determined display method, wherein different display methods are determined based on whether the viewpoint is inside the object or outside the object.

17. The information processing apparatus according to claim 2, wherein the control unit determines, on a basis of the distance being a first value, a display method in which the binocular parallax is a second value as the display method, and wherein the control unit determines, on a basis of the distance being a third value, a display method in which the binocular parallax is a fourth value different than the second value as the display method.

* * * * *